Aug. 17, 1965    E. R. LIGON ETAL    3,201,094
BLENDER
Filed Jan. 23, 1963

INVENTORS
Elmer R. Ligon &
Wendell J. Johnson &
Norman C. Grotheer

BY Fishburn and Gold
ATTORNEYS 3,201,094
BLENDER
Elmer R. Ligon, Pittsburg, Kans., Wendell J. Johnson, St. Louis, Mo., and Norman C. Grotheer, Pittsburg, Kans., assignors to W. S. Dickey Clay Manufacturing Company, Kansas City, Mo., a corporation of Delaware
Filed Jan. 23, 1963, Ser. No. 253,422
5 Claims. (Cl. 259—5)

This invention relates to mixing devices, and more particularly to improvements in high speed continuous blenders.

The blending of materials often presents many difficult problems for various reasons. For example, the materials may be physically incompatible, have highly abrasive components, produce a highly exothermal reaction, or tend to set up or harden in the mixing apparatus.

The principal objects of the present invention are: to provide a mixer or blender which is extremely efficient in mixing incompatible materials including abrasive components with only slight or negligible wear on moving parts; to provide such apparatus which offers good balance of moving parts and, therefore, very little vibration during normal use; to provide such a device which requires very little maintenance and is simple in construction; to provide such blending apparatus which permits closed continuous mixing for production line use; to provide such a device which is very easily and quickly disassembled, permitting easy access thereinto for fast material removal prior to setting up; to provide such apparatus which operates on a wobble principle using a spherical joint with a unique construction; to provide such apparatus which operates primarily due to shearing action between closely spaced surfaces in a conical chamber and wherein output is directly proportional to rotational speed input; and to provide such a mixing device which has a very high continuous output compared to the volume of the mixing chamber, efficiently removes heat generated by high mixing friction and exothermal reactions, and exhibits long life under extremely rugged conditions.

Other objects and advantages of this invention will become apparent from the following description taken in connection with the accompanying drawings wherein are set forth by way of illustration and example certain embodiments of this invention.

Figure 1:
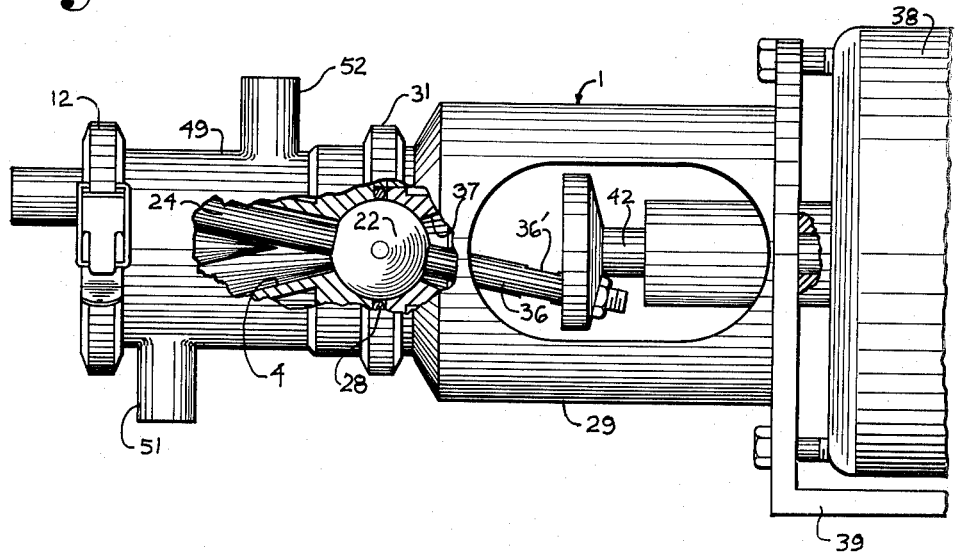
FIG. 1 is a fragmentary side elevational view of a mixer or blender embodying this invention with a portion broken away showing a spherical joint therein.
Figure 2:
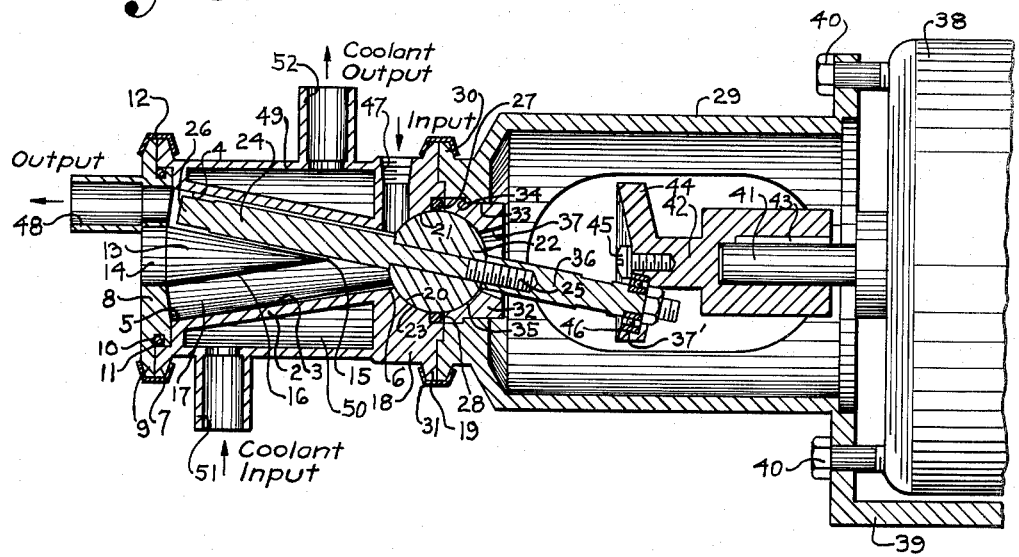
FIG. 2 is a fragmentary side elevational cross-sectional view through the mixer or blender of FIG. 1 showing the interior thereof.

Referring to the drawings in more detail:

The reference numeral 1 generally indicates a blender or mixing apparatus embodying this invention. The blender 1 is of the type adaptable for mixing incompatible materials, for example, in the production of mixes containing fast setting epoxy resins, polyurethanes and polyesters and often including highly abrasive fillers. Such mixes generally require very complete blending with high speed flow-through to avoid setting up within the mixing chamber.

In the illustrated example, the blender 1 includes a side wall 2 having a curved interior surface 3 forming a frustoconical enclosure 4 with a base end 5 and an apex end 6. The side wall 2 includes a radially outwardly extending annular flange 7 adjacent the base end 5. A cap 8 has an annular flange 9 matching the side wall flange 7 and adapted to removably abut thereagainst. An annular groove 10 extends into the cap 8 and contains an O-ring seal 11 adapted to seal against an interior surface formed by the flange 7 when the flanges 7 and 9 are abutting. It is noted that the cap 8 is axially forwardly disengageable from the side wall 2. A high speed manually releasable ring clamp 12 engages the side wall flange 9 and cap flange 7 for removably supporting the cap adjacent the side wall 2 and covering the chamber base end 5.

A conical member 13 having a base 14 and an apex 15 is supported at the base 14 on the cap 8 and extends coaxially into the enclosure 4 with the apex 15 being located well within the enclosure. The conical member 13 has an exterior surface 16 with the same slope as the interior surface 3 and is radially equally spaced from the interior surface 3 forming a conical mixing chamber 17 therebetween.

An end wall 18 is, in the illustrated example, integral with the side wall 2 and has a radially outwardly extending annular flange 19. The end wall 18 is located at the enclosure apex end 6 and has semi-spherical walls 20 forming an opening 21 therethrough axially of the mixing chamber 17. A sphere 22 is engaged on one hemispheric portion 23 thereof in universal sliding contact with the end wall 18 at the end wall opening 21. A rigid cylindrical elongated finger 24 is rigidly secured to the sphere 22 by means of an integral extension 25 extending through the sphere 22. The finger 24 extends from the hemispheric portion 23 beyond the end wall opening 21 into the mixing chamber 17. The free end 26 of the finger 24 has suitable flats thereon to act as wrench seats for assembly and disassembly. The diameter of the finger 24 is only slightly smaller than the closest distance between the exterior surface 16 of the conical member 13 and the interior surface 3 of the side wall 2. In a typical example, the last-mentioned size difference is in the order of .010 inch for a ½-inch diameter 3½ inch long finger (3000 centipoise viscosity input), however, it is to be understood that higher viscosities generally require greater clearances.

An O-ring seal 27 is engaged in and supported by a groove 28 in the end wall 18 and is slidably engaged in sealing contact against the sphere 22 substantially at an equator circle to prevent leakage from the mixing chamber 17 which may work between the end wall 18 and sphere 22.

A support shell 29 is substantially hollow on the interior thereof and has an annular flange 30 matching and abuttable against the end wall flange 19. A fast acting, hand operated ring clamp 31 similar to the clamp 12 engages the end wall flange 19 and the support shell flange 30 for removably supporting the end wall 18 adjacent the support shell 29.

An annular bearing member 32 is supported in an opening 33 formed in the shell 29 coaxially of the mixing chamber 17. The opening 33 has a shoulder 34 engaging the bearing member 32, preventing motion away from the end wall 18. The bearing member 32 is supported by the shell 29 in universal sliding engagement with the sphere 22 on a hemispheric portion 35 thereof opposite to the hemispheric portion 23. The bearing member 32 urges the sphere 22 against the end wall 18 and traps the sphere and the seal or O-ring 27 between the end wall 18 and the bearing member. A rigid rod 36 has a threaded bore extending axially thereinto and threadedly receiving the extension 25 of the finger 24 for rigidly securing the rod 36 to the sphere. The rod 36 extends through a conical opening 37 in the bearing member 32 coaxial with the mixing chamber 17 and into the hollow support shell 29. The rod 36 has wrench flats 36' and extends oppositely coaxially with the finger 24 and terminates in a bearing 37' suitably secured thereto.

A suitable prime mover such as a motor 38 is mounted by means of a bracket 39 and bolts 40 adjacent the shell 29 and has a driven shaft 41 entering the support shell 29 coaxially of the mixing chamber 17. A coupling 42 is rotatably fixed with respect to the shaft 41 by means of a suitable key 43 and includes a head 44 to which the bearing 37' is eccentrically engaged by means of an axial screw 45 and receiving socket 46 for rotatably driving the finger 24 through the mixing chamber 17. The motion of the rod 36 and finger 24 produces a wobbling of the sphere 22 which has been found to produce an extreme minimum of wear between contacting surfaces even in the presence of abrasive materials.

An input connection member or passageway 47 extends through the side wall 2 and end wall 18 and communicates with the mixing chamber 17 adjacent the sphere 22 for pumping materials to be mixed or blended thereinto under pressure. An output connection member or passageway 48 extends through the cap 3 and communicates with the mixing chamber 17 between the side wall 2 and conical member 13 adjacent the base end 5. It is to be understood that any suitable high pressure may be maintained within the mixing chamber 2 by controlled blockage of mixed material discharging through the output passageway 48.

A jacket 49 is spaced from and surrounds the side wall 2 and engages the end wall 18 and flange 9 forming a coolant pasageway 50 therebetween. Suitable input and output connection members 51 and 52 communicate with the coolant passageway 50 for circulating any suitable cooling fluid therethrough for controlling the temperature within the mixing chamber 17.

In operation, materials to be mixed or blended are pumped under pressure into the mixing chamber while the coupling 42 is rotated by the motor 38 at speeds, for example, between 1000 and 3000 r.p.m. Due to the very high mixing efficiency caused by the shearing forces produced between the finger 24 and the mixing chamber surfaces, susprisingly high flow-through speed is usually obtained, only a very small contained volume of material being in the mixing chamber at any one instant. In case of a production shut-down when mixing fast setting materials, it is a very simple matter to merely release the clamps 12 and 31, permitting easy access to all material contacting parts of the mixer for cleaning.

A very desirable feature of this improved mixer is that capacity is substantially directly proportional to the input rotational speed for easily predicting optimum mixing conditions for any desirable flow rate. This is in contrast to well known blade mixers wherein output is not a straight line function of rotational speed input. Also, the well known blade mixers require approximately twice the internal volume and thus twice the material hold-up time than the above-described mixer for a similar production rate. Although the finger 24 rotates in an orbital path, the moving parts extending in opposite directions from the sphere 22 may be easily quite closely dynamically balanced so that in operation surprisingly little vibration is produced unless excessively high rotational speeds are used.

It is to be understood that while one form of this invention has been illustrated and described, it is not to be limited to the specific form or arrangement of parts herein described and shown except insofar as such limitations are included in the claims.

What we claim and desire to secure by Letters Patent is:

1. Apparatus for mixing materials comprising:
  (a) a side wall having a curved interior surface forming a frusto-conical enclosure with a base end and an apex end, an end member adjacent said side wall at said enclosure base and,
  (b) a conical member having a base and an apex portion, said conical member being supported by said end member and extending coaxially into said enclosure with said conical member apex portion being located within said enclosure, said conical member having an exterior surface spaced from said interior surface forming a conical mixing chamber therebetween,
  (c) an end wall at said enclosure apex end and having means forming an opening therethrough axially of said mixing chamber, a spherically curved member, means for maintaining said curved member engaged in universal sliding contact with said end wall and substantially closing said end wall opening, an annular seal, means for maintaining said seal in slidable sealing contact with said curved member and in sealing engagement with said end wall, a rigid finger rigidly secured to said curved member and extending therefrom beyond said end wall opening into said mixing chamber,
  (d) a rigid rod rigidly secured to said curved member and extending oppositely and substantially coaxially of said finger, a prime mover driven shaft, means supporting said driven shaft extending coaxially of and spaced from said mixing chamber, a coupling rotatably secured on said shaft and rotatably and eccentrically engaging said rod for orbitally driving said finger through said mixing chamber,
  (e) an input connection member communicating with said mixing chamber, and an output connection member communicating with said mixing chamber at a position spaced from said input connection member.

2. The apparatus as set forth in claim 1 wherein:
  (a) said side wall has a flange adjacent said base end,
  (b) said end member has a flange cooperable with said side wall flange, and including
  (c) a quick-release ring clamp engaging said side wall flange and said end member flange for removably supporting said end member adjacent said side wall.

3. The apparatus as set forth in claim 1 wherein:
  (a) said end wall has a clamp-engaging support portion, and including
  (b) a support shell having a clamp-engaging support portion cooperable with said end wall support portion, quick-release clamping means engaging said end wall support portion and said support shell support portion for removably supporting said end wall adjacent said support shell,
  (c) said means for maintaining said curved member engaged including a bearing member supported by said support shell in universal sliding engagement with said curved member and urging said curved member against said end wall, the disengagement of said clamping means permitting the separation of said end wall and support shell and release of said curved member.

4. The apparatus as set forth in claim 1 wherein:
  (a) said spherically curved member is substantially a sphere, and said
  (b) means for maintaining said annular seal in slidable sealing contact positions said seal against said sphere substantially at an equator circle thereof.

5. A seal joint comprising,
  (a) a curved member substantially spherical in shape,
  (b) a first wall having means forming a concave circular portion defining an opening therethrough, said concave portion having a curvature matching said curved member and having a maximum diameter less than the diameter of said curved member for slidably receiving said curved member thereagainst on not more than one hemisphere of said curved member,
  (c) a second wall, means removably maintaining said second wall adjacent said first wall, said second wall having means forming a concave circular portion for slidably engaging said curved member at a position opposed to said first named concave portion when said walls are adjacent for removably trapping said curved member therebetween, said second named concave portion defining an opening through the second wall,
(d) two rods secured with respect to said curved member and extending radially in opposite directions therefrom and respectively through said openings, said first and second walls being spaced apart adjacent said curved member forming a circular groove opening toward said curved member on a circle surrounding the axis of said rods, and
(e) a ring seal in sealing engagement with at least one of said walls and fixed in said groove and extending into sliding sealing contact with said curved member on the curved surface thereof.

References Cited by the Examiner

UNITED STATES PATENTS

| | | | |
|---|---|---|---|
| 1,148,227 | 7/15 | Heeley | 74—18.1 |
| 2,170,303 | 8/39 | Helstrup. | |
| 2,437,983 | 3/48 | Wenander | 259—1 |
| 2,539,436 | 1/51 | Kost | 291—129 X |
| 2,861,156 | 11/58 | Kulka. | |
| 3,116,878 | 1/64 | Reiter | 259—102 X |

FOREIGN PATENTS 1,049,803  2/59  Germany.

IRVING BUNEVICH, *Primary Examiner.*